(12) United States Patent
Nguyen et al.

(10) Patent No.: US 12,510,159 B2
(45) Date of Patent: Dec. 30, 2025

(54) SEAL WITH RADIAL CUT TORUS SPRING

(71) Applicant: SAINT-GOBAIN PERFORMANCE PLASTICS CORPORATION, Solon, OH (US)

(72) Inventors: Chien Nguyen, Barrington, RI (US); Xiang Yan, Barrington, RI (US)

(73) Assignee: SAINT-GOBAIN PERFORMANCE PLASTICS CORPORATION, Malvern, PA (US)

(*) Notice: Subject to any disclaimer, the term of this patent is extended or adjusted under 35 U.S.C. 154(b) by 328 days.

(21) Appl. No.: 17/660,856

(22) Filed: Apr. 27, 2022

(65) Prior Publication Data

US 2022/0349475 A1 Nov. 3, 2022

Related U.S. Application Data

(60) Provisional application No. 63/180,808, filed on Apr. 28, 2021.

(51) Int. Cl.
| | |
|---|---|
| *F16J 15/32* | (2016.01) |
| *F16F 1/02* | (2006.01) |
| *F16F 1/18* | (2006.01) |
| *F16J 15/3212* | (2016.01) |
| *F16J 15/3236* | (2016.01) |

(52) U.S. Cl.
CPC ....... *F16J 15/3212* (2013.01); *F16J 15/3236* (2013.01)

(58) Field of Classification Search
CPC ........................... F16J 15/3212; F16J 15/3236
USPC ...................................................... 267/167
See application file for complete search history.

(56) References Cited

U.S. PATENT DOCUMENTS

| | | | |
|---|---|---|---|
| 3,357,693 A | 12/1967 | Perry | |
| 4,133,542 A * | 1/1979 | Janian | F16J 15/3212 277/555 |
| 4,585,239 A * | 4/1986 | Nicholson | F16J 15/3212 277/570 |

(Continued)

FOREIGN PATENT DOCUMENTS

| | | |
|---|---|---|
| JP | S61065966 A | 4/1986 |
| JP | 2018135927 A | 8/2018 |

(Continued)

OTHER PUBLICATIONS

International Search Report for PCT/US2022/071942, mailed Aug. 18, 2022, 11 pages.

(Continued)

*Primary Examiner* — Nicholas J Lane
*Assistant Examiner* — James K Hsiao
(74) *Attorney, Agent, or Firm* — Abel Schillinger, LLP; Ann Palma

(57) ABSTRACT

Systems and methods include providing a seal for an assembly. The seal includes a jacket having a base, an inner sealing leg, and an outer sealing leg, and further includes a spring disposed within the jacket between and in contact with the inner sealing leg and the outer sealing leg. The spring includes a metallic annular body comprising an inner diameter and an outer diameter, and a plurality of radially cut perforations disposed about at least one of the inner diameter and the outer diameter of the metallic annular body.

20 Claims, 9 Drawing Sheets

(56) References Cited

U.S. PATENT DOCUMENTS

| | | | | |
|---|---|---|---|---|
| 4,706,970 A * | 11/1987 | Ramirez | F16J 15/3212 | 277/556 |
| 4,736,932 A * | 4/1988 | Haslim | B62D 5/083 | 5/247 |
| 4,858,897 A * | 8/1989 | Irifune | F16D 3/72 | 267/181 |
| 5,062,619 A * | 11/1991 | Sato | F16F 1/02 | 267/273 |
| 5,160,122 A * | 11/1992 | Balsells | F16F 3/12 | 267/167 |
| 5,163,692 A * | 11/1992 | Schofield | F16J 15/3236 | 277/467 |
| 5,265,890 A * | 11/1993 | Balsells | F16J 15/3236 | 277/467 |
| 5,361,577 A * | 11/1994 | Cromer | F23R 3/48 | 285/227 |
| 5,558,393 A * | 9/1996 | Hawkins | F16F 1/328 | 267/164 |
| 5,630,591 A * | 5/1997 | Drijver | F16J 15/025 | 277/553 |
| 5,799,953 A * | 9/1998 | Henderson | F16J 15/3236 | 277/567 |
| 6,296,255 B1 * | 10/2001 | Hashimoto | H01L 21/67126 | 277/927 |
| 6,789,803 B2 * | 9/2004 | Radosav | F16J 15/348 | 277/377 |
| 6,881,923 B2 * | 4/2005 | Battaglia | B23K 26/0846 | 219/121.72 |
| 7,159,857 B2 * | 1/2007 | Janian | F16F 1/025 | 267/164 |
| 7,175,112 B2 * | 2/2007 | Uhlmann | F02M 47/027 | 267/152 |
| 7,464,941 B2 * | 12/2008 | Hashimoto | H01J 37/32431 | 277/913 |
| 7,497,443 B1 * | 3/2009 | Steinetz | F16J 15/0887 | 277/647 |
| 7,859,169 B2 * | 12/2010 | Stocker | F16F 1/028 | 310/348 |
| 8,251,373 B2 | 8/2012 | Lev et al. | | |
| 8,967,301 B2 * | 3/2015 | Curry | E21B 10/25 | 175/371 |
| 9,121,507 B2 * | 9/2015 | Ghalambor | F16J 15/3452 | |
| 9,206,857 B2 * | 12/2015 | Englert | F16D 3/74 | |
| 10,550,942 B2 | 2/2020 | Badrossamay | C09K 3/1009 | |
| 10,773,269 B2 * | 9/2020 | DeJong | B05B 11/1077 | |
| 11,131,385 B2 * | 9/2021 | Zitting | F16J 15/3248 | |
| D936,610 S * | 11/2021 | Grabowski | D13/154 | |
| 11,480,250 B2 * | 10/2022 | Balsells | F16J 15/3212 | |
| 11,862,880 B2 * | 1/2024 | Grabowski | H01R 43/16 | |
| 2002/0153664 A1 * | 10/2002 | Schroeder | F16J 15/56 | 277/551 |
| 2007/0194508 A1 * | 8/2007 | Bucciero | F16F 1/028 | 267/182 |
| 2008/0302156 A1 * | 12/2008 | Itaya | B21F 3/02 | 72/138 |
| 2011/0156361 A1 * | 6/2011 | Ghalambor | F16J 15/3212 | 29/896.9 |
| 2011/0187058 A1 * | 8/2011 | Curry | E21B 10/25 | 277/336 |
| 2014/0329421 A1 * | 11/2014 | Tatzel | H01R 13/17 | 439/816 |
| 2014/0360020 A1 | 12/2014 | Ghalambor et al. | | |
| 2014/0361492 A1 | 12/2014 | Lenhert | | |
| 2017/0261108 A1 | 9/2017 | Soler et al. | | |
| 2019/0107166 A1 | 4/2019 | Whitford et al. | | |
| 2019/0305455 A1 * | 10/2019 | Uppleger | H01R 43/16 | |
| 2021/0381600 A1 * | 12/2021 | George | F16J 15/3232 | |

FOREIGN PATENT DOCUMENTS

| | | |
|---|---|---|
| WO | 2017135091 A1 | 8/2017 |
| WO | 2020005734 A1 | 1/2020 |
| WO | 2022232793 A1 | 11/2022 |

OTHER PUBLICATIONS

"Full Contact Springs." MW Components, https://www.mwcomponents.com/full-contact-springs, 8 pages.

* cited by examiner

SEAL WITH RADIAL CUT TORUS SPRING

CROSS-REFERENCE TO RELATED APPLICATION(S)

This application claims priority under 35 U.S.C. § 119(e) to U.S. Provisional Application No. 63/180,808, entitled "SEAL WITH RADIAL CUT TORUS SPRING," by Chien NGUYEN et al., filed Apr. 28, 2021, which is assigned to the current assignee hereof and incorporated herein by reference in its entirety.

BACKGROUND OF THE INVENTION

Seals are used in many industrial applications to prevent leakage between components of an assembly. In some applications, these seals may be subjected to extreme operating conditions, such as cryogenic temperatures, which may cause the seal to shrink or deform significantly away from the hardware, thereby reducing the contact pressure between the seal and the hardware. The reduction in contact pressure at these extreme operating conditions may result in increased leakage between the seal and the hardware. Seals subjected to such extreme operating conditions therefore require higher reliability to properly maintain their sealing function. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
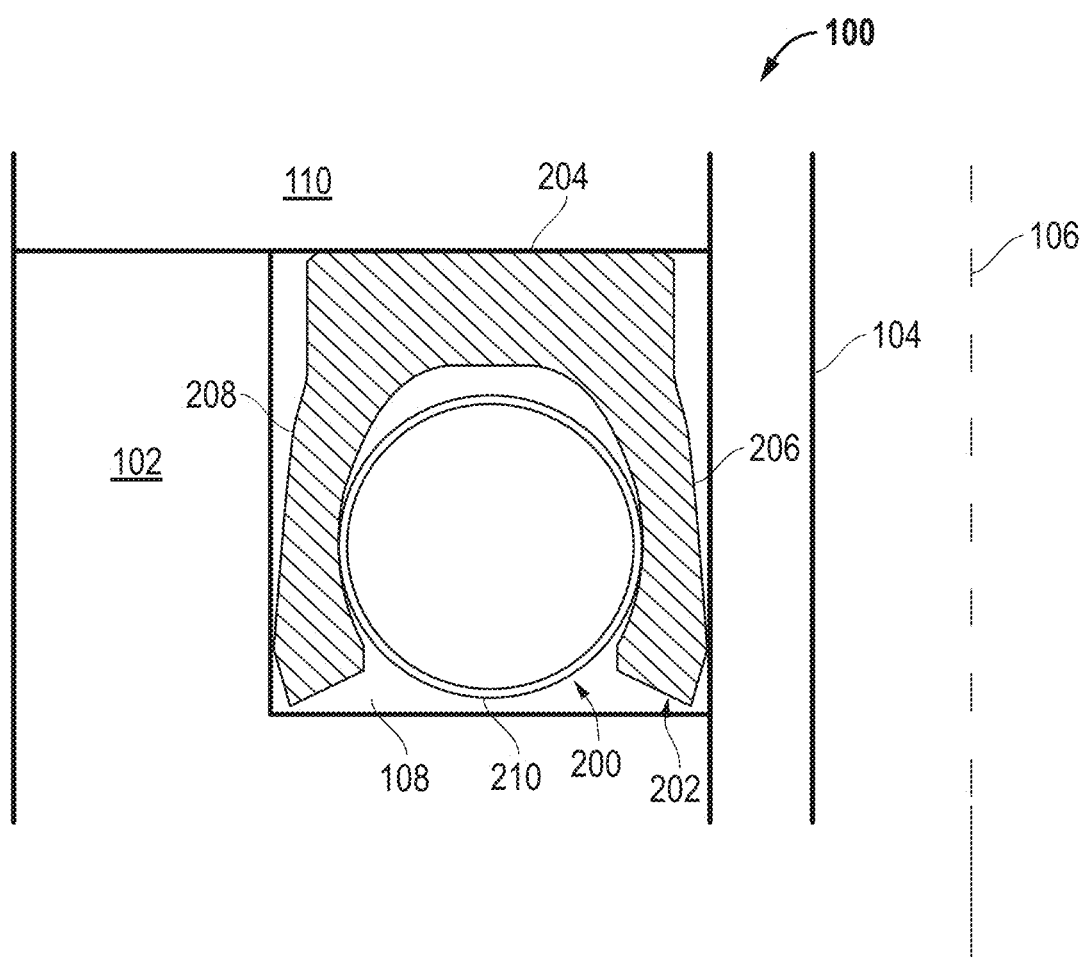
FIG. 1 is a partial cross-sectional view of an assembly according to an embodiment of the disclosure.

FIG. 1 shows a partial cross-sectional view of an assembly 100 according to an embodiment of the disclosure. In some embodiments, the assembly 100 may be a coupling assembly, solenoid assembly, or valve assembly. In more specific embodiments, the assembly 100 may be an aerospace, alternative energy, medical, or subsea coupling, loading arms, solenoid, or valve. The assembly 100 may generally comprise a housing 102 and a shaft 104 that rotates within the housing about an axis 106. In some embodiments, the shaft 104 may comprise a hollow shaft. However, in other embodiments, the shaft 104 may comprise a solid shaft. The assembly 100 may further comprise a cavity 108 formed within the housing 102 and between the housing 102 and the shaft 104. In some embodiments, the housing 102 may comprise one or more additional components, such as a cap 110, that collectively form the housing 102. In some embodiments, components of the housing 102 and/or the cap 110 may selectively removable to allow access to the cavity 108 to allow for installation and/or removal of an annular seal 200 disposed within the cavity 108. As such, in some embodiments, the cap 110 may form one or more walls of the cavity 108. However, in some embodiments, the housing may not comprise additional components, such as the cap 110, and may be a single unitary component of the assembly 100.

The annular seal 200 may generally be disposed within the cavity 108 and about the shaft 104 and/or axis 106. The seal 200 may be configured to contact and provide a facial or radial seal between the housing 102 and the shaft 104 of the assembly 100. The seal 200 may comprise a jacket 202 and an annular energizing element or spring 210. The jacket 202 may comprise a base 204 adjacent to and in contact with a portion of the housing 102 or an optional cap 110. The jacket 202 may also comprise an inner sealing leg 206 extending from the base 204 and adjacent to and in contact with the shaft 104, and an outer sealing leg 208 extending from the base 204 adjacent to and in contact with the housing 102. The jacket 202 may generally be formed from a thermoset, thermoplastic, or a combination thereof. More specifically, the jacket 202 may be formed from PTFE, a fluoropolymer, a perfluoropolymer, PTFE, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof, either with or without reinforcing fillers.

The spring 210 may generally comprise a metallic annular body having an inner diameter and an outer diameter. The spring 210 may be disposed within the jacket 202 between and in contact with the inner sealing leg 206 and the outer sealing leg 208 of the jacket 202. More specifically, the spring 210 may be disposed within the jacket 202 such that the inner diameter of the metallic annular body of the spring 210 is adjacent to and in contact with an inner sealing leg 206 of the jacket 202, and such that the outer diameter of the metallic annular body of the spring 210 is adjacent to and in contact with the outer sealing leg 208 of the jacket 202. In the embodiment shown, the spring 210 comprises a substantially circular cross-sectional profile or shape. The spring 210 may generally be formed from a resilient metallic material. More specifically, the spring 210 may be formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, or bronze. In some embodiments, the spring 210 may comprise a coating, such as a gold coating, an aluminum chromium nitride (AlCrN) coating, a titanium aluminum nitride (TiAlN) coating, any other wear-resistant metallic coating, or any combination thereof.

Figure 2:
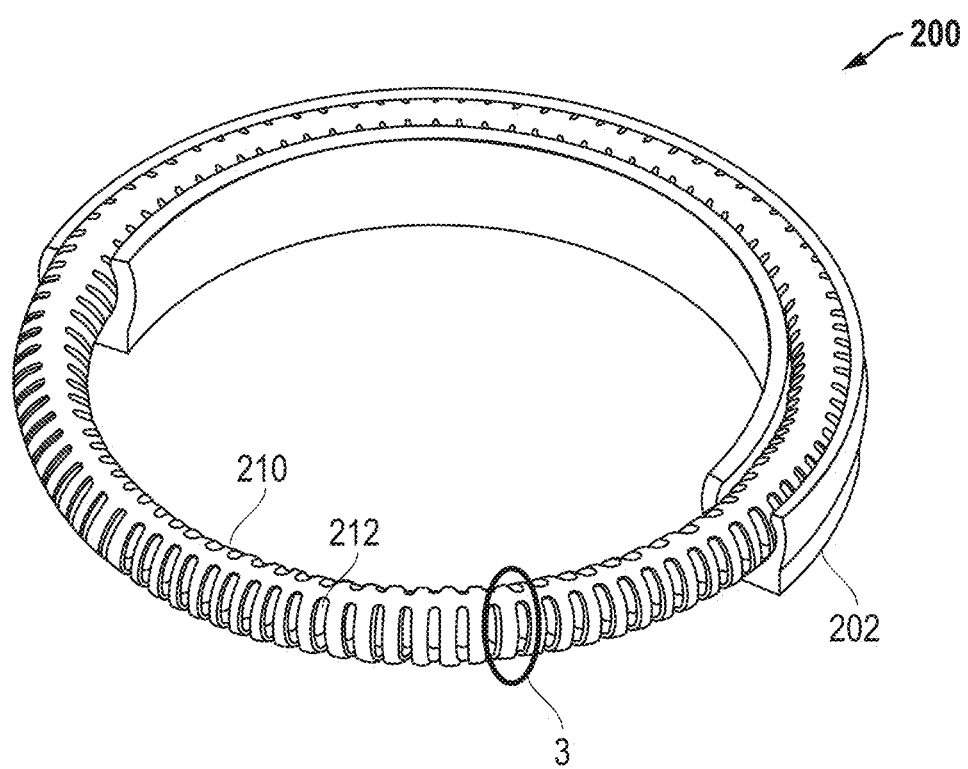
FIG. 2 is an oblique view of a seal according to an embodiment of the disclosure.

FIG. 2 shows an oblique view of an annular seal 200 according to an embodiment of the disclosure. The seal 200 generally comprises the jacket 202 and the spring 210 disposed within the jacket 202. In the pictured embodiment, a portion of the jacket 202 has been removed for clarity. As shown with the portion of the jacket 202 removed, the spring 210 may comprise a plurality of radially cut perforations 212 disposed about at least one of the inner diameter and the outer diameter of the metallic annular body of the seal 210. As shown, the spring 210 may generally be disposed within the jacket 202 between and in contact with the inner sealing leg 206 and the outer sealing leg 208 of the jacket 202. More specifically, the spring 210 may be disposed within the jacket 202 such that radially cut perforations 212 disposed about the inner diameter of the metallic annular body of the spring 210 are adjacent to and in contact with an inner sealing leg 206 of the jacket 202, and such that the radially cut perforations 212 disposed about the outer diameter of the metallic annular body of the spring 210 are adjacent to and in contact with the outer sealing leg 208 of the jacket 202.

Figure 3:
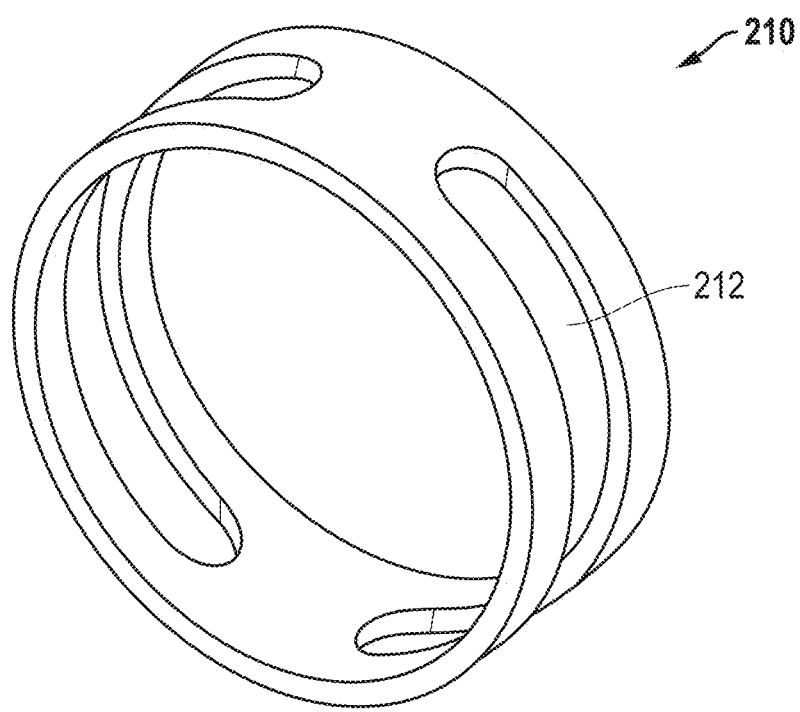
FIG. 3 is a partial cross-sectional oblique view of a spring according to an embodiment of the disclosure.
Figure 4:
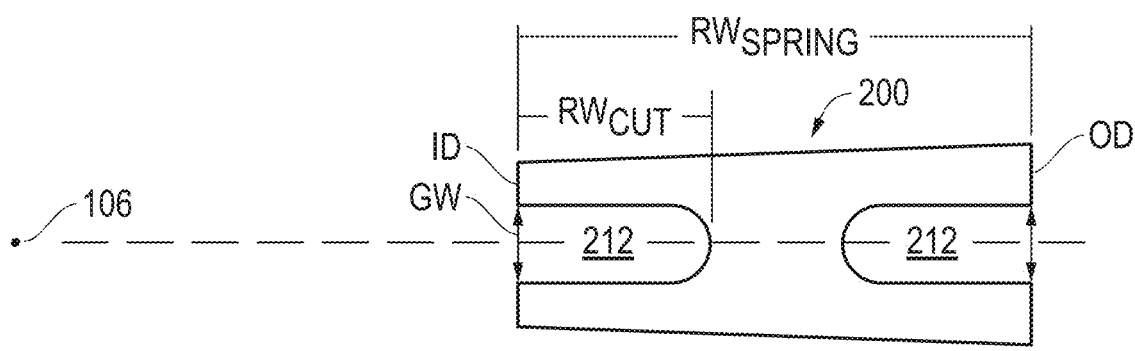
FIG. 4 is a partial cross-sectional top view of a spring according to an embodiment of the disclosure.

FIGS. 3 and 4 show a partial cross-sectional oblique view and a partial cross-sectional top view of the spring 210 of the seal 200 according to an embodiment of the disclosure. As shown in FIGS. 3 and 4, the partial cross-sections are representative of approximately a single pitch of the spring 210 of the seal 200. In some embodiments, the radially cut perforations 212 may be disposed about the inner diameter (ID) of the metallic annular body of the spring 210. In some embodiments, the radially cut perforations 212 may be disposed about the outer diameter (OD) of the metallic annular body of the spring 210. In some embodiments, the radially cut perforations 212 may be disposed about both the inner diameter and the outer diameter of the metallic annular body of the spring 210. The radially cut perforations 212 disposed about the inner diameter may generally be disconnected from the radially cut perforations 212 disposed about the outer diameter.

The spring 210 may generally comprise a radial width ($RW_{SPRING}$), defined as the difference between the outer diameter and the inner diameter. Likewise, the radially cut perforations 212 may comprise a radial width ($RW_{CUT}$). More specifically, the radially cut perforations 212 disposed about the inner diameter may comprise a radial width measured from the inner diameter towards the outer diameter, and the radially cut perforations 212 disposed about the outer diameter may comprise a radial width measured from the outer diameter towards the inner diameter. In some embodiments, the radially cut perforations 212 disposed about the inner diameter may comprise substantially similar radial widths. In some embodiments, the radially cut perforations 212 disposed about the outer diameter may comprise substantially similar radial widths. In some embodiments, the radially cut perforations 212 disposed about the inner diameter and the radially cut perforations 212 disposed about the outer diameter may comprise different radial widths. In some embodiments, the radially cut perforations 212 disposed about the inner diameter and the radially cut perforations 212 disposed about the outer diameter may comprise substantially similar radial widths.

In some embodiments, the radially cut perforations 212 may comprise a radial width that is at least 1%, at least 2%, at least 3%, at least 4%, at least 5%, at least 10%, at least 15%, at least 20%, at least 25%, or at least 30% of the radial width of the spring 210. In some embodiments, the radially cut perforations 212 may comprise a radial width that is not greater than 75%, not greater than 60%, not greater than 55%, not greater than 50%, not greater than 49%, not greater than 48%, not greater than 47%, not greater than 46%, not greater than 45%, or not greater than 40% of the radial width of the spring 210. Further, it will be appreciated that the radially cut perforations 212 may comprise a radial width between any of these minimum and maximum values, such as at least 1% to not greater than 75%, or even, at least 25% to not greater than 50% of the radial width of the spring 210.

In some embodiments, the radially cut perforations 212 may comprise a radial width of at least 0.05 mm, at least 0.10 mm, at least 0.15 mm, at least 0.20 mm, at least 0.25 mm, at least 0.5 mm, at least 0.75 mm, or at least 1.0 mm. In some embodiments, the radially cut perforations 212 may comprise a radial width of not greater than 10.0 mm, not greater than 5.0 mm, not greater than 3.0 mm, not greater than 2.5 mm, not greater than 2.0 mm, not greater than 1.75 mm, not greater than 1.5 mm, or not greater than 1.25 mm. Further, it will be appreciated that the radially cut perforations 212 may comprise a radial width between any of these minimum and maximum values, such as at least 0.05 mm to not greater than 10.0 mm, or even, at least 0.5 mm to not greater than 1.75 mm.

The radially cut perforations 212 may comprise a gap width (GW). In some embodiments, the radially cut perforations 212 disposed about the inner diameter may comprise substantially similar gap widths. In some embodiments, the radially cut perforations 212 disposed about the outer diameter may comprise substantially similar gap widths. In some embodiments, the radially cut perforations 212 disposed about the inner diameter and the radially cut perforations 212 disposed about the outer diameter may comprise different gap widths. In some embodiments, the radially cut perforations 212 disposed about the inner diameter and the radially cut perforations 212 disposed about the outer diameter may comprise substantially similar gap widths.

In some embodiments, the radially cut perforations 212 may comprise a gap width of at least 0.005 mm, at least 0.01 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm. In some embodiments, the radially cut perforations 212 may comprise a gap width of not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, or not greater than 0.25 mm. Further, it will be appreciated that the radially cut perforations 212 may comprise a gap width between any of these minimum and maximum values, such as at least 0.005 mm to not greater than 1.0 mm, or even, at least 0.025 mm to not greater than 0.50 mm.

The radially cut perforations 212 may be disposed about the inner diameter and/or the outer diameter at a particular angular pitch (defined as the angle between adjacent radially cut perforations 212). In some embodiments, the radially cut perforations 212 disposed about the inner diameter and the radially cut perforations 212 disposed about the outer diameter may comprise different angular pitches. In some embodiments, wherein the radially cut perforations 212 disposed about the inner diameter and the radially cut perforations 212 disposed about the outer diameter comprise substantially similar angular pitches, such that the radially cut perforations 212 disposed about the inner diameter and the radially cut perforations 212 disposed about the outer diameter are radially aligned.

In some embodiments, the radially cut perforations 212 may comprise an angular pitch of at least 0.05 degrees, at least 0.10 degrees, at least 0.15 degrees, at least 0.25 degrees, at least 0.5 degrees, at least 1 degree, at least 2 degrees, at least 3 degrees, at least 4 degrees, at least 5 degrees, or at least 10 degrees. In some embodiments, the radially cut perforations 212 may comprise an angular pitch of not greater than 30 degrees, not greater than 20 degrees, 15 degrees, not greater than 10 degrees, not greater than 5 degrees, not greater than 4 degrees, not greater than 3 degrees, not greater than 2 degrees, not greater than 1 degree, not greater than 0.5 degrees, or not greater than 0.25 degrees. Further, it will be appreciated that the radially cut perforations 212 may comprise an angular pitch between any of these minimum and maximum values, such as at least 0.05 degrees to not greater than 30 degrees, or even, at least 1 degree to not greater than 5 degrees.

The spring 210 may generally be suitable for various sized applications. In some embodiments, the inner diameter of the metallic annular body of the spring 210 may be at least 0.05 mm, at least 0.25 mm, at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater. In some embodiments, the outer diameter of the metallic annular body of the spring 210 may be at least 0.25 mm, at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Figure 5A:
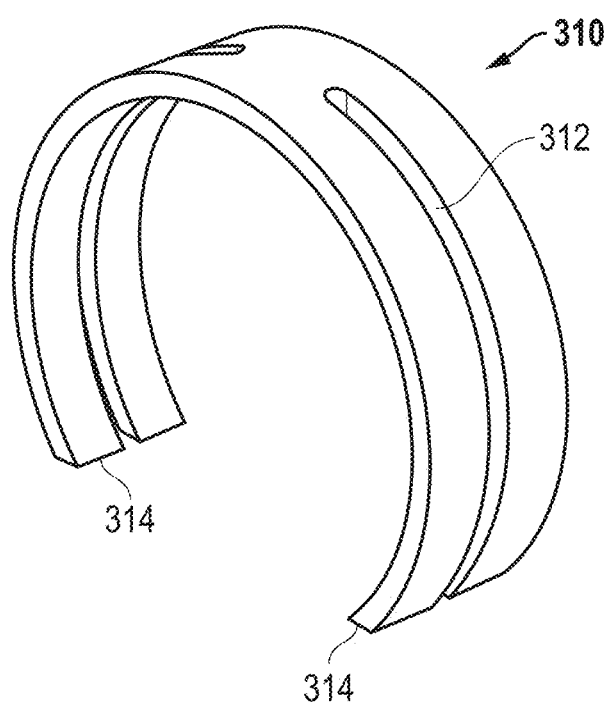
FIG. 5A is a partial cross-sectional oblique view of a spring according to an alternative embodiment of the disclosure.

FIG. 5A is a partial cross-sectional oblique view of an annular spring 310 according to an alternative embodiment of the disclosure. The spring 310 may generally be substantially similar to the spring 210. However, as opposed to the substantially circular cross-sectional profile of spring 210, the spring 310 comprises a substantially C-shaped cross-sectional profile. It will be appreciated that spring 310 comprises a plurality of radially cut perforations 312 that may generally be substantially similar to the radially cut perforations 212 of the spring 210. Further, the spring 310 may also comprise a substantially round cross-sectional profile that truncates in opposing distal ends 314 to form the substantially C-shaped cross-sectional profile. Additionally, in some embodiments, the radially cut perforations 312 may extend through the distal ends 314 of the spring 310.

Figure 5B:
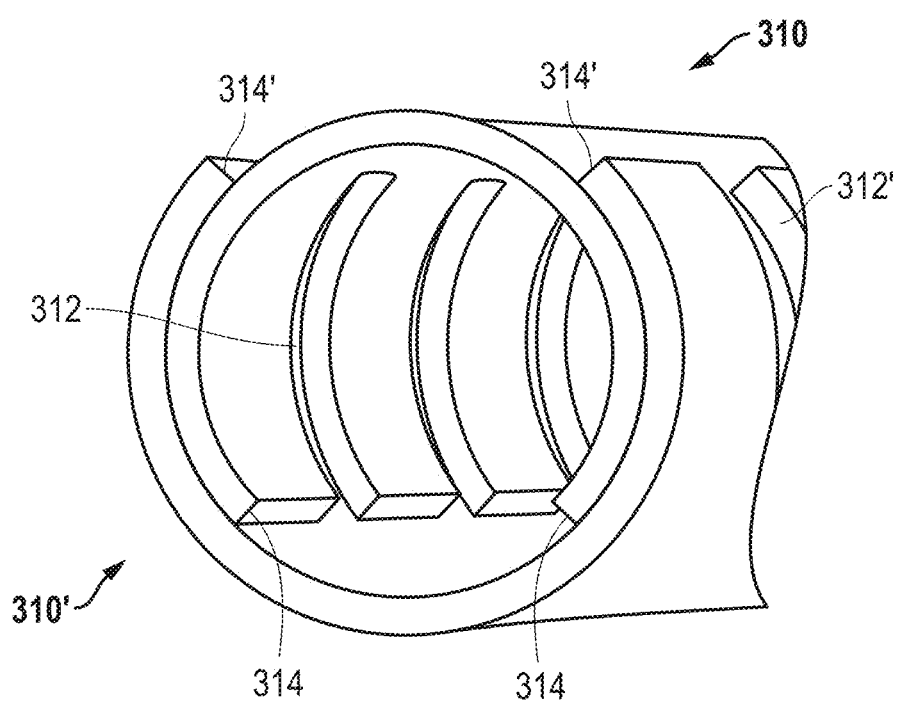
FIG. 5B is a partial cross-sectional oblique view of a plurality of springs according to an alternative embodiment of the disclosure.

FIG. 5B is a partial cross-sectional oblique view of a plurality of annular springs 310, 310' according to an alternative embodiment of the disclosure. The springs 310, 310' may each generally be substantially similar to the spring 210. However, as opposed to the substantially circular cross-sectional profile of spring 210, the springs 310, 310' comprises a substantially C-shaped cross-sectional profile. It will be appreciated that springs 310, 310' comprise a plurality of radially cut perforations 312, 312' that may generally be substantially similar to the radially cut perforations 212 of the spring 210. Further, the springs 310, 310' may also comprise a substantially round cross-sectional profile that truncates in opposing distal ends 314, 314' to form the substantially C-shaped cross-sectional profile. Additionally, in some embodiments, the radially cut perforations 312, 312' may extend through the distal ends 314, 314' of the springs 310, 310'. As shown in FIG. 5B, the springs 310, 310' may fit together in the radial direction along at least a part of the circumference of the springs 310, 310'. This combination of springs may be done with the spring of FIGS. 3-4.

Figure 6:
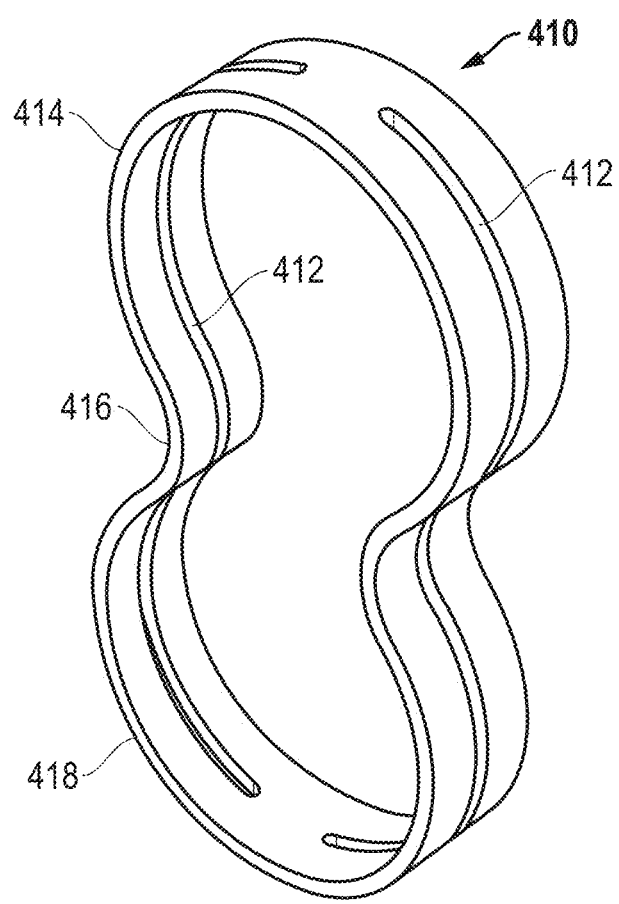
FIG. 6 is a partial cross-sectional oblique view of a spring according to another alternative embodiment of the disclosure.

FIG. 6 is a partial cross-sectional oblique view of an annular spring 410 according to another alternative embodiment of the disclosure. The spring 410 may generally be substantially similar to the spring 210. However, as opposed to the substantially circular cross-sectional profile of spring 210, the spring 410 comprises a substantially peanut or figure-eight-shaped cross-sectional profile. It will be appreciated that spring 410 comprises a plurality of radially cut perforations 412 that may generally be substantially similar to the radially cut perforations 212 of the spring 210. Further, the spring 410 may also comprise an upper rounded portion 414, a lower rounded portion 418, and an opposing center rounded portion 416 disposed between the upper rounded portion 414 and the lower rounded portion 418 to form the substantially peanut or figure-eight-shaped cross-sectional profile. Additionally, in some embodiments, the radially cut perforations 412 may be continuous from the upper rounded portion 414 to the lower rounded portion 418, such that the radially cut perforations 412 extend from the upper rounded portion 414, through the center rounded portion 416, and into the lower rounded portion 418. Furthermore, in some embodiments, embodiments of a spring may comprise a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile having a plurality of radially cut perforations disposed in the metallic annular body of the spring in accordance with embodiments disclosed herein.

Figure 7:
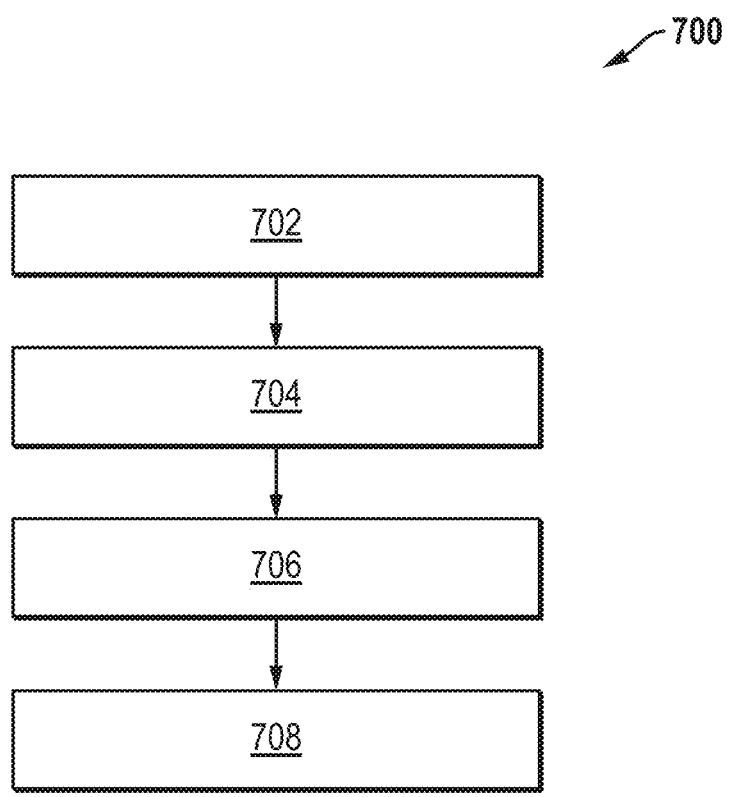
FIG. 7 is a flowchart of a method of forming a seal in an assembly according to an embodiment of the disclosure.

FIG. 7 is a flowchart of a method 700 of forming a seal in an assembly 100 according to an embodiment of the disclosure. The method 700 may begin at block 702 by providing an assembly 100 having a shaft 104 having an axis 106, a housing 102 comprising a cavity 108 and disposed annularly about the shaft 104, and a seal 200 disposed within the cavity 108 and configured to provide a radial seal between the shaft 104 and the housing 102, wherein the seal 200 comprises: a jacket 202 having a base 204, an inner sealing leg 206, and an outer sealing leg 208; and a spring 210, 310, 410 disposed within the jacket 202 between and in contact with the inner sealing leg 206 and the outer sealing leg 208 and comprising a metallic annular body comprising an inner diameter and an outer diameter, and a plurality of radially cut perforations 212, 312, 412 disposed about at least one of the inner diameter and the outer diameter of the metallic annular body.

The method 700 may continue at block 704 by disposing the seal 200 within the assembly 100, such that the inner sealing leg 206 of the jacket 202 forms a radial seal with the shaft 104, and such that the outer sealing leg 208 of the jacket 202 forms a radial seal with the housing 102. The method 700 may continue at block 706 by operating the assembly 100. In some embodiments, operating the assembly 100 may comprise operating the assembly at cryogenic temperatures. The method 700 may continue at block 708 by maintaining a difference in contact pressure between the contact pressure of the seal 200 at the metallic annular body of the spring 210, 310, 410 and the contact pressure of the seal 200 at the radially cut perforations 212, 312, 412.

In some embodiments, the difference between the contact pressure of the seal 200 at the metallic annular body of the spring 210, 310, 410 and the contact pressure of the seal 200 at the radially cut perforations 212, 312, 412 may be at least 0.5 MPa, at least 1.0 MPa, at least 2.0 MPa, at least 2.5 MPa, at least 3.0 MPa, at least 4.0 MPa, at least 5.0 MPa, at least 7.5 MPa, at least 10 MPa, or at least 15 MPa. In some embodiments, the difference in contact pressure between the contact pressure of the seal 200 at the metallic annular body of the spring 210, 310, 410 and the contact pressure of the seal 200 at the radially cut perforations 212, 312, 412 may be not greater than 50 MPa, not greater than 45 MPa, not greater than 40 MPa, not greater than 35 MPa, not greater than 30 MPa, not greater than 25 MPa, not greater than 20 MPa, not greater than 19 MPa, not greater than 18 MPa, not greater than 17 MPa, not greater than 16 MPa, not greater than 15 MPa, not greater than 10 MPa, or not greater than 5 MPa. Further, it will be appreciated that the difference between the contact pressure of the seal 200 at the metallic annular body of the spring 210, 310, 410 and the contact pressure of the seal 200 at the radially cut perforations 212, 312, 412 may be between any of these minimum and maximum values, such as at least 0.5 MPa to not greater than 50 MPa, or even, at least 5 MPa to not greater than 20 MPa.

In some embodiments, the difference in contact pressure between the contact pressure of the seal 200 at the metallic annular body of the spring 210, 310, 410 and the contact pressure of the seal 200 at the radially cut perforations 212, 312, 412 may be not greater than 95%, not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or substantially no difference.

In some embodiments, the contact pressure of the seal 200 at the radially cut perforations 212, 312, 412 may be at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the contact pressure of the seal 200 at the metallic annular body of the spring 210, 310, 410.

Figure 8:
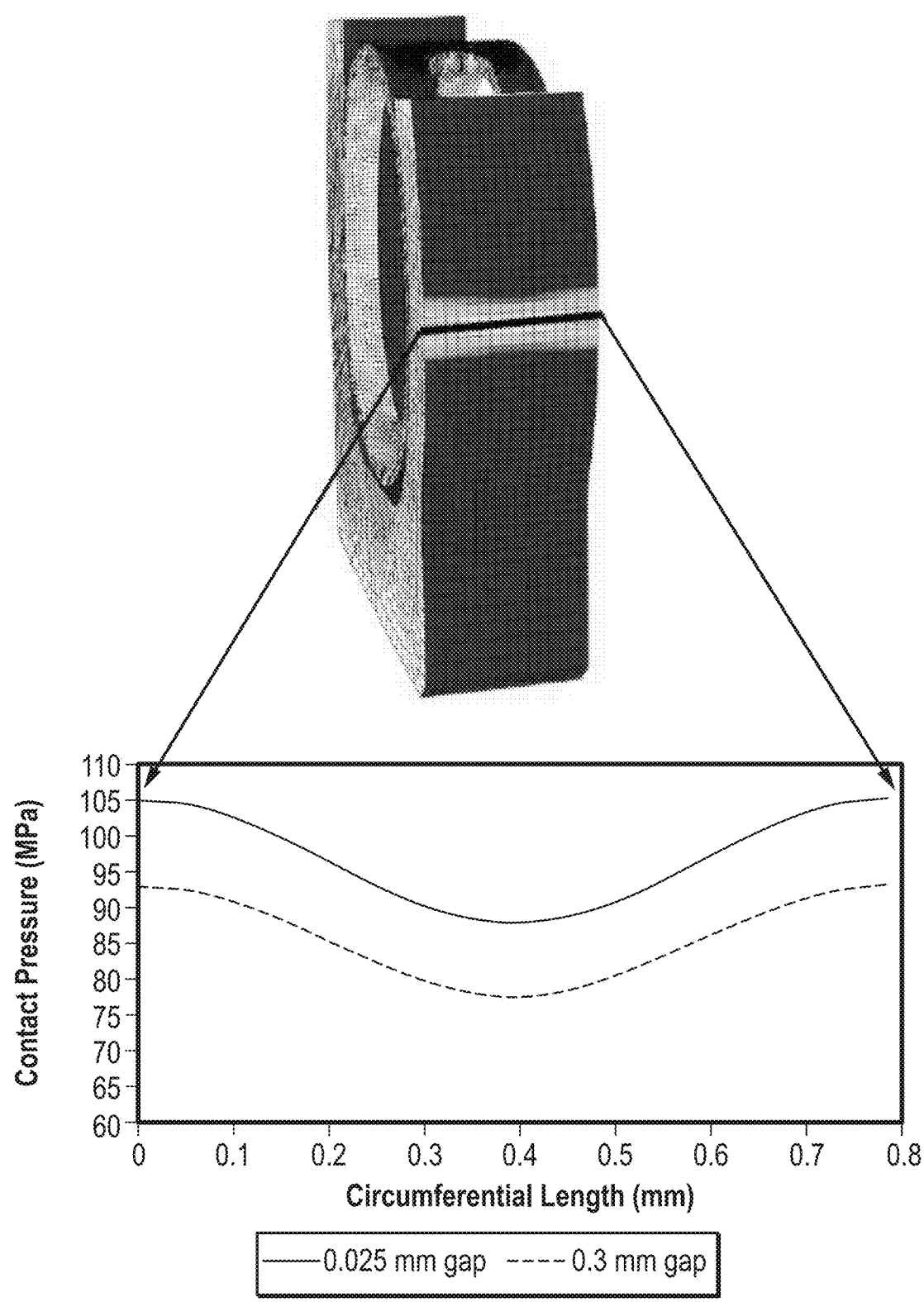
FIG. 8 is a graph of contact pressure across a circumferential length of two seals according to embodiments of the disclosure.

FIG. 8 is a graph of contact pressure across a circumferential length of two seals 200 according to embodiments of the disclosure. As shown, a first sample seal 200 having a spring 210 with a plurality of radially cut perforations 210 having a gap width of about 0.025 mm disposed about the inner diameter and outer diameter was tested at cryogenic temperatures. The contact pressure of the seal 200 at the metallic annular body of the spring 210 was about 105 MPa. The contact pressure at the radially cut perforation was about 87 MPa. The difference in contact pressure of the seal 200 at the metallic annular body of the spring 210 and the contact pressure of the seal 200 at the radially cut perforation 210 was about 18 MPa. A second sample seal 200 having a spring 210 with a plurality of radially cut perforations 210 having a gap width of about 0.30 mm disposed about the inner diameter and outer diameter was tested at cryogenic temperatures. The contact pressure of the seal 200 at the metallic annular body of the spring 210 was about 93 MPa. The contact pressure at the radially cut perforation was about 77 MPa. The difference in contact pressure of the seal 200 at the metallic annular body of the spring 210 and the contact pressure of the seal 200 at the radially cut perforation 210 was about 16 MPa.

As compared to a traditional annular seal having a continuous helical perforation winding about the spring, which may have a difference in contact pressure at the metallic annular body of the spring and the contact pressure of the seal at the helical perforations of 50 MPa or even greater, embodiments of the seal 200 maintain an improved contact pressure profile at cryogenic temperatures, and at other operating temperatures. Accordingly, embodiments of the seal 200 are more suitable and more reliable for various applications than traditional annular seals having a continuous helical perforation winding about the spring.

In some embodiments, the contact pressure of the seal 200 at the metallic annular body of the spring 210, 310, 410 may be at least 5 MPa, at least 10 MPa, at least 15 MPa, at least 20 MPa, at least 25 MPa, at least 30 MPa, at least 35 MPa, at least 40 MPa, at least 45 MPa, at least 50 MPa, at least 60 MPa, at least 65 MPa, at least 70 MPa, at least 75 MPa, at least 80 MPa, at least 85 MPa, at least 90 MPa, or at least 95 MPa. In some embodiments, the contact pressure of the seal 200 at the radially cut perforations 212, 312, 412 may be at least 1 MPa, at least 2 MPa, at least 3 MPa, at least 4 MPa, at least 5 MPa, at least 10 MPa, at least 15 MPa, at least 20 MPa, at least 25 MPa, at least 30 MPa, at least 35 MPa, at least 40 MPa, at least 45 MPa, at least 50 MPa, at least 60 MPa, at least 65 MPa, at least 70 MPa, at least 75 MPa, at least 80 MPa, at least 85 MPa, or at least 90 MPa.

In some embodiments, the difference between the contact pressure of the seal 200 at the metallic annular body of the spring 210, 310, 410 and the contact pressure of the seal 200 at the radially cut perforations 212, 312, 412 may be at least 0.5 MPa, at least 1.0 MPa, at least 2.0 MPa, at least 2.5 MPa, at least 3.0 MPa, at least 4.0 MPa, at least 5.0 MPa, at least 7.5 MPa, at least 10 MPa, or at least 15 MPa. In some embodiments, the difference between the contact pressure of the seal 200 at the metallic annular body of the spring 210, 310, 410 and the contact pressure of the seal 200 at the radially cut perforations 212, 312, 412 may be not greater than 50 MPa, not greater than 45 MPa, not greater than 40 MPa, not greater than 35 MPa, not greater than 30 MPa, not greater than 25 MPa, not greater than 20 MPa, not greater than 19 MPa, not greater than 18 MPa, not greater than 17 MPa, not greater than 16 MPa, not greater than 15 MPa, not greater than 10 MPa, or not greater than 5 MPa. Further, it will be appreciated that the difference between the contact pressure of the seal 200 at the metallic annular body of the spring 210, 310, 410 and the contact pressure of the seal 200 at the radially cut perforations 212, 312, 412 may be between any of these minimum and maximum values, such as at least 0.5 MPa to not greater than 50 MPa, or even, at least 5 MPa to not greater than 20 MPa.

In some embodiments, the difference in contact pressure between the contact pressure of the seal 200 at the metallic annular body of the spring 210, 310, 410 and the contact pressure of the seal 200 at the radially cut perforations 212, 312, 412 may be not greater than 95%, not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or substantially no difference.

In some embodiments, the contact pressure of the seal 200 at the radially cut perforations 212, 312, 412 may be at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the contact pressure of the seal 200 at the metallic annular body of the spring 210, 310, 410.

Embodiments of an assembly 100, a seal 200, a spring 210, 310, 410, and/or a method 700 of forming a seal in an assembly 100 may include one or more of the following:

Embodiment 1. A spring, comprising: a metallic annular body comprising an inner diameter and an outer diameter; and a plurality of radially cut perforations disposed about at least one of the inner diameter and the outer diameter of the metallic annular body.

Embodiment 2. A seal, comprising: a jacket having a base, an inner sealing leg, and an outer sealing leg; and a spring disposed within the jacket between and in contact with the inner sealing leg and the outer sealing leg, the spring comprising: a metallic annular body comprising an inner diameter and an outer diameter; and a plurality of radially cut perforations disposed about at least one of the inner diameter and the outer diameter of the metallic annular body.

Embodiment 3. An assembly, comprising: a shaft having an axis; a housing comprising a cavity and disposed annularly about the shaft; and a seal disposed within the cavity and configured to provide a radial seal between the shaft and the housing, the seal comprising: a jacket having a base, an inner sealing leg adjacent to and in contact with the shaft, and an outer sealing leg adjacent to and in contact with the housing; and a spring disposed within the jacket between and in contact with the inner sealing leg and the outer sealing leg, the spring comprising: a metallic annular body comprising an inner diameter and an outer diameter; and a plurality of radially cut perforations disposed about at least one of the inner diameter and the outer diameter of the metallic annular body.

Embodiment 4. The spring, seal, or assembly of any of embodiments 1 to 3, wherein the radially cut perforations are disposed about the inner diameter of the metallic annular body of the spring.

Embodiment 5. The spring, seal, or assembly of any of embodiments 1 to 4, wherein the radially cut perforations are disposed about the outer diameter of the metallic annular body of the spring.

Embodiment 6. The spring, seal, or assembly of any of embodiments 1 to 5, wherein the radially cut perforations are disposed about both the inner diameter and the outer diameter.

Embodiment 7. The spring, seal, or assembly of embodiment 6, wherein the radially cut perforations disposed about the inner diameter are disconnected from the radially cut perforations disposed about the outer diameter.

Embodiment 8. The spring, seal, or assembly of any of embodiments 1 to 7, wherein the radially cut perforations comprise a radial width that is at least 1%, at least 2%, at least 3%, at least 4%, at least 5%, at least 10%, at least 15%, at least 20%, at least 25%, or at least 30% of the radial width of the spring.

Embodiment 9. The spring, seal, or assembly of any of embodiments 1 to 8, wherein the radially cut perforations comprise a radial width that is not greater than 75%, not greater than 60%, not greater than 55%, not greater than 50%, not greater than 49%, not greater than 48%, not greater than 47%, not greater than 46%, not greater than 45%, or not greater than 40% of the radial width of the spring.

Embodiment 10. The spring, seal, or assembly of any of embodiments 1 to 9, wherein the radially cut perforations comprise a radial width of at least 0.05 mm, at least 0.10 mm, at least 0.15 mm, at least 0.20 mm, at least 0.25 mm, at least 0.5 mm, at least 0.75 mm, or at least 1.0 mm.

Embodiment 11. The spring, seal, or assembly of any of embodiments 1 to 10, wherein the radially cut perforations comprise a radial width of not greater than 10.0 mm, not greater than 5.0 mm, not greater than 3.0 mm, not greater than 2.5 mm, not greater than 2.0 mm, not greater than 1.75 mm, not greater than 1.5 mm, or not greater than 1.25 mm.

Embodiment 12. The spring, seal, or assembly of any of embodiments 6 to 11, wherein the radially cut perforations disposed about the inner diameter and the radially cut perforations disposed about the outer diameter comprise different radial widths.

Embodiment 13. The spring, seal, or assembly of any of embodiments 6 to 11, wherein the radially cut perforations disposed about the inner diameter and the radially cut perforations disposed about the outer diameter comprise substantially similar radial widths.

Embodiment 14. The spring, seal, or assembly of any of embodiments 1 to 13, wherein the radially cut perforations comprise a gap width of at least 0.001 mm, at least 0.005 mm, at least 0.01 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm.

Embodiment 15. The spring, seal, or assembly of any of embodiments 1 to 14, wherein the radially cut perforations comprise a gap width of not greater than 100 mm, not greater than 10 mm, not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, or not greater than 0.25 mm.

Embodiment 16. The spring, seal, or assembly of any of embodiments 14 to 15, wherein the radially cut perforations disposed about the inner diameter and the radially cut perforations disposed about the outer diameter comprise different gap widths.

Embodiment 17. The spring, seal, or assembly of any of embodiments 14 to 15, wherein the radially cut perforations disposed about the inner diameter and the radially cut perforations disposed about the outer diameter comprise substantially similar gap widths.

Embodiment 18. The spring, seal, or assembly of any of embodiments 1 to 17, wherein the radially cut perforations comprise an angular pitch of at least 0.05 degrees, at least 0.10 degrees, at least 0.15 degrees, at least 0.25 degrees, at least 0.5 degrees, at least 1 degree, at least 2 degrees, at least 3 degrees, at least 4 degrees, at least 5 degrees, or at least 10 degrees.

Embodiment 19. The spring, seal, or assembly of any of embodiments 1 to 18, wherein the radially cut perforations comprise an angular pitch of not greater than 30 degrees, not greater than 20 degrees, not greater than 15 degrees, not greater than 10 degrees, not greater than 5 degrees, not greater than 4 degrees, not greater than 3 degrees, not greater than 2 degrees, not greater than 1 degree, not greater than 0.5 degrees, or not greater than 0.25 degrees.

Embodiment 20. The spring, seal, or assembly of any of embodiments 18 to 19, wherein the radially cut perforations disposed about the inner diameter and the radially cut perforations disposed about the outer diameter comprise different angular pitches.

Embodiment 21. The spring, seal, or assembly of any of embodiments 18 to 19, wherein the radially cut perforations disposed about the inner diameter and the radially cut perforations disposed about the outer diameter comprise substantially similar angular pitches, such that the radially cut perforations disposed about the inner diameter and the radially cut perforations disposed about the outer diameter are radially aligned.

Embodiment 22. The spring, seal, or assembly of any of embodiments 1 to 21, wherein the inner diameter of the metallic annular body of the spring is at least 0.05 mm, at least 0.25 mm, at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater.

Embodiment 23. The spring, seal, or assembly of any of embodiments 1 to 22, wherein the outer diameter of the metallic annular body of the spring is at least 0.25 mm, at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Embodiment 24. The spring, seal, or assembly of any of embodiments 1 to 23, wherein the metallic annular body is formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, or bronze.

Embodiment 25. The spring, seal, or assembly of embodiment 24, wherein the metallic annular body comprises a coating.

Embodiment 26. The spring, seal, or assembly of embodiment 25, wherein the coating comprises a gold strike coating, an aluminum chromium nitride (AlCrN) coating, or a titanium aluminum nitride (TiAlN) coating.

Embodiment 27. The spring, seal, or assembly of any of embodiments 1 to 26, wherein the spring is disposed within a jacket.

Embodiment 28. The spring, seal, or assembly of embodiment 27, wherein the inner diameter of the metallic annular body of the spring is adjacent to and in contact with an inner sealing leg of the jacket, and wherein the outer diameter of the metallic annular body of the spring is adjacent to and in contact with an outer sealing leg of the jacket.

Embodiment 29. The spring, seal, or assembly of any of embodiments 27 to 28, wherein the jacket is formed from PTFE, a fluoropolymer, a perfluoropolymer, PTFE, TFM, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof, either with or without reinforcing fillers.

Embodiment 30. The spring, seal, or assembly of any of embodiments 1 to 29, wherein a contact pressure of the seal at the metallic annular body of the spring is at least 5 MPa, at least 10 MPa, at least 15 MPa, at least 20 MPa, at least 25 MPa, at least 30 MPa, at least 35 MPa, at least 40 MPa, at least 45 MPa, at least 50 MPa, at least 60 MPa, at least 65 MPa, at least 70 MPa, at least 75 MPa, at least 80 MPa, at least 85 MPa, at least 90 MPa, or at least 95 MPa.

Embodiment 31. The spring, seal, or assembly of any of embodiments 1 to 30, wherein a contact pressure of the seal at the radially cut perforations is at least 1 MPa, at least 2 MPa, at least 3 MPa, at least 4 MPa, at least 5 MPa, at least 10 MPa, at least 15 MPa, at least 20 MPa, at least 25 MPa, at least 30 MPa, at least 35 MPa, at least 40 MPa, at least 45 MPa, at least 50 MPa, at least 60 MPa, at least 65 MPa, at least 70 MPa, at least 75 MPa, at least 80 MPa, at least 85 MPa, or at least 90 MPa.

Embodiment 32. The spring, seal, or assembly of any of embodiments 1 to 31, wherein a difference between the contact pressure of the seal at the metallic annular body of the spring and the contact pressure of the seal at the radially cut perforations is at least 0.5 MPa, at least 1.0 MPa, at least 2.0 MPa, at least 2.5 MPa, at least 3.0 MPa, at least 4.0 MPa, at least 5.0 MPa, at least 7.5 MPa, at least 10 MPa, or at least 15 MPa.

Embodiment 33. The spring, seal, or assembly of any of embodiments 1 to 32, wherein a difference between the contact pressure of the seal at the metallic annular body of the spring and the contact pressure of the seal at the radially cut perforations is not greater than 50 MPa, not greater than 45 MPa, not greater than 40 MPa, not greater than 35 MPa, not greater than 30 MPa, not greater than 25 MPa, not greater than 20 MPa, not greater than 19 MPa, not greater than 18 MPa, not greater than 17 MPa, not greater than 16 MPa, not greater than 15 MPa, not greater than 10 MPa, or not greater than 5 MPa.

Embodiment 34. The spring, seal, or assembly of any of embodiments 1 to 33, wherein a difference between the contact pressure of the seal at the metallic annular body of the spring and the contact pressure of the seal at the radially cut perforations is not greater than 95%, not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or substantially no difference.

Embodiment 35. The spring, seal, or assembly of any of embodiments 1 to 34, wherein the contact pressure of the seal at the radially cut perforations is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the contact pressure of the seal at the metallic annular body of the spring.

Embodiment 36. A method of forming a seal in the assembly according to any of embodiments 1 to 35, comprising: providing an assembly having a shaft having an axis, a housing comprising a cavity and disposed annularly about the shaft, and a seal disposed within the cavity and configured to provide a radial seal between the shaft and the housing, wherein the seal comprises: a jacket having a base, an inner sealing leg, and an outer sealing leg; and a spring disposed within the jacket between and in contact with the inner sealing leg and the outer sealing leg and comprising a metallic annular body comprising an inner diameter and an outer diameter, and a plurality of radially cut perforations disposed about at least one of the inner diameter and the outer diameter of the metallic annular body; disposing the seal within the assembly, such that the inner sealing leg of the jacket forms a radial seal with the shaft, and such that the outer sealing leg of the jacket forms a radial seal with the housing; operating the assembly; and maintaining a difference in contact pressure between the contact pressure of the seal at the metallic annular body of the spring and the contact pressure of the seal at the radially cut perforations.

Embodiment 37. The method of embodiment 36, wherein a difference between the contact pressure of the seal at the metallic annular body of the spring and the contact pressure of the seal at the radially cut perforations is at least 0.5 MPa, at least 1.0 MPa, at least 2.0 MPa, at least 2.5 MPa, at least 3.0 MPa, at least 4.0 MPa, at least 5.0 MPa, at least 7.5 MPa, at least 10 MPa, or at least 15 MPa.

Embodiment 38. The method of any of embodiments 36 to 37, wherein a difference between the contact pressure of the seal at the metallic annular body of the spring and the contact pressure of the seal at the radially cut perforations is not greater than 50 MPa, not greater than 45 MPa, not greater than 40 MPa, not greater than 35 MPa, not greater than 30 MPa, not greater than 25 MPa, not greater than 20 MPa, not greater than 19 MPa, not greater than 18 MPa, not greater than 17 MPa, not greater than 16 MPa, not greater than 15 MPa, not greater than 10 MPa, or not greater than 5 MPa.

Embodiment 39. The method of any of embodiments 36 to 38, wherein a difference between the contact pressure of the seal at the metallic annular body of the spring and the contact pressure of the seal at the radially cut perforations is not greater than 95%, not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or substantially no difference.

Embodiment 40. The method of any of embodiments 36 to 39, wherein the contact pressure of the seal at the radially cut perforations is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the contact pressure of the seal at the metallic annular body of the spring.

Embodiment 41. The spring, seal, or assembly of any of embodiments 1 to 35 or the method of any of embodiments 36 to 40, wherein the spring comprises a substantially circular-shaped cross-sectional profile, a substantially C-shaped cross-sectional profile, a substantially peanut or figure-eight-shaped profile, a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile having a plurality of radially cut perforations disposed in the metallic annular body of the spring.

Embodiment 42. The seal or assembly of any of embodiments 1 to 35 or the method of any of embodiments 36 to 41, wherein the seal is operable at cryogenic temperatures, or wherein operating the assembly occurs at cryogenic temperatures.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A spring, comprising:
a metallic annular body comprising an inner diameter and an outer diameter; and
a plurality of radially cut perforations disposed about at least one of the inner diameter and the outer diameter of the metallic annular body,
wherein the radially cut perforations comprise a radial width that is at least 1% and not greater than 75% of a radial width of the spring,
wherein the radially cut perforations comprise a gap width that is less than the radial width of the spring not disposed with the plurality of radially cut perforations, and wherein at least one point along a circumference of the metallic annular body the spring has a closed shape as viewed in a cross-sectional plane.

2. The spring of claim 1, wherein the radially cut perforations are disposed about the inner diameter of the metallic annular body of the spring.

3. The spring of claim 1, wherein the radially cut perforations are disposed about the outer diameter of the metallic annular body of the spring.

4. The spring of claim 1, wherein the radially cut perforations are disposed about both the inner diameter and the outer diameter, wherein the radially cut perforations disposed on the inner diameter are separate from the radially cut perforations disposed on the outer diameter.

5. The spring of claim 4, wherein the radially cut perforations disposed about the inner diameter are disconnected from the radially cut perforations disposed about the outer diameter.

6. The spring of claim 4, wherein the radially cut perforations disposed about the inner diameter and the radially cut perforations disposed about the outer diameter comprise different radial widths.

7. The spring of claim 1, wherein the radial width of the radially cut perforations is at least 0.05 mm and not greater than 10.0 mm.

8. The spring of claim 1, wherein the radially cut perforations disposed about the inner diameter and the radially cut perforations disposed about the outer diameter comprise substantially similar radial widths.

9. The spring of claim 1, wherein the gap width of the radially cut perforations is at least 0.001 mm and not greater than 100 mm.

10. The spring of claim 1, wherein the radially cut perforations comprise an angular pitch of at least 0.05 degrees and not greater than 30 degrees.

11. The spring of claim 1, wherein the metallic annular body is formed from a nickel, chromium, titanium, tungsten, stainless steel, spring steel, steel, aluminum, zinc, copper, magnesium, tin, platinum, lead, iron, bronze, or alloys thereof.

12. The spring of claim 11, wherein the metallic annular body comprises a coating.

13. The spring of claim 12, wherein the coating comprises a gold strike coating, an aluminum chromium nitride (AlCrN) coating, or a titanium aluminum nitride (TiAlN) coating.

14. The spring of claim 1, wherein at least one point along a circumference of a gap-less, metallic, annular body is continuous in a plane defined by an axial and radial direction.

15. A seal, comprising:
a jacket having a base, an inner sealing leg, and an outer sealing leg; and
a spring disposed within the jacket between and in contact with the inner sealing leg and the outer sealing leg, the spring comprising:
a metallic annular body comprising an inner diameter and an outer diameter; and
a plurality of radially cut perforations disposed about at least one of the inner diameter and the outer diameter of the metallic annular body,
wherein the radially cut perforations comprise a radial width that is at least 1% and not greater than 75% of a radial width of the spring,
wherein the radially cut perforations comprise a gap width that is less than the radial width of the spring not disposed with the plurality of radially cut perforations, and
wherein at least one point along a circumference of the metallic annular body the spring has a closed shape as viewed in a cross-sectional plane.

16. The seal of claim 15, wherein the jacket is formed from a fluoropolymer, a perfluoropolymer, a polyarylketone, a polysulfone, aromatic polyamides, thermoplastic polyimides, or any combination thereof.

17. The seal of claim 16, wherein the inner diameter of the metallic annular body of the spring is adjacent to and in contact with an inner sealing leg of the jacket, and wherein the outer diameter of the metallic annular body of the spring is adjacent to and in contact with an outer sealing leg of the jacket.

18. The seal of claim 15, wherein the radially cut perforations are disposed about both the inner diameter and the outer diameter, wherein the radially cut perforations disposed on the inner diameter are separate from the radially cut perforations disposed on the outer diameter.

19. An assembly, comprising:
a shaft having an axis;
a housing comprising a cavity and disposed annularly about the shaft; and
a seal disposed within the cavity and configured to provide a radial seal between the shaft and the housing, the seal comprising:
a jacket having a base, an inner sealing leg adjacent to and in contact with the shaft, and an outer sealing leg adjacent to and in contact with the housing; and
a spring disposed within the jacket between and in contact with the inner sealing leg and the outer sealing leg, the spring comprising:
a metallic annular body comprising an inner diameter and an outer diameter; and
a plurality of radially cut perforations disposed about at least one of the inner diameter and the outer diameter of the metallic annular body, wherein a difference between the contact pressure of the seal at the metallic annular body of the spring and the contact pressure of the seal at the radially cut perforations is at least 4% and not greater than 95%.

20. The assembly of claim 19, wherein a difference between the contact pressure of the seal at the metallic annular body of the spring and the contact pressure of the seal at the radially cut perforations is at least 0.5 MPa and not greater than 50 MPa.

* * * * *